US007886047B1

(12) United States Patent
Potluri

(10) Patent No.: US 7,886,047 B1
(45) Date of Patent: Feb. 8, 2011

(54) AUDIENCE MEASUREMENT OF WIRELESS WEB SUBSCRIBERS

(75) Inventor: Dora Potluri, Plano, TX (US)

(73) Assignee: Sprint Communications Company L.P., Overland Park, KS (US)

(*) Notice: Subject to any disclaimer, the term of this patent is extended or adjusted under 35 U.S.C. 154(b) by 157 days.

(21) Appl. No.: 12/169,630

(22) Filed: Jul. 8, 2008

(51) Int. Cl.
*G06F 15/173* (2006.01)

(52) U.S. Cl. .................................. 709/224; 705/10

(58) Field of Classification Search .............. None
See application file for complete search history.

(56) References Cited

U.S. PATENT DOCUMENTS

| 7,146,416 | B1 | 12/2006 | Yoo et al. |
| 2001/0025275 | A1* | 9/2001 | Tanaka et al. ............ 705/412 |
| 2001/0054035 | A1* | 12/2001 | Lee ............................... 707/3 |
| 2002/0161648 | A1 | 10/2002 | Mason et al. |
| 2003/0046311 | A1* | 3/2003 | Baidya et al. ............. 707/200 |
| 2004/0068665 | A1* | 4/2004 | Fox et al. .................. 713/201 |
| 2006/0004850 | A1 | 1/2006 | Chowdhury |
| 2008/0183664 | A1* | 7/2008 | Cancel et al. ................ 707/2 |
| 2009/0222329 | A1* | 9/2009 | Ramer et al. ................ 705/10 |
| 2010/0057560 | A1* | 3/2010 | Skudlark et al. ......... 705/14.49 |

OTHER PUBLICATIONS

Barnes, James D., et al., "Web Log Filtering," Filing Date—Jan. 22, 2008, U.S. Appl. No. 12/018,194.
FAIPP Pre-Interview Communication dated May 12, 2010, U.S. Appl. No. 12/018,194, filed Jan. 22, 2008, 4 pages.
Office Action dated Sep. 14, 2010, U.S. Appl. No. 12/018,194 filed on Jan. 22, 2008, 15 pages.

* cited by examiner

*Primary Examiner*—Wing F Chan
*Assistant Examiner*—Kostas Katsikis

(57) ABSTRACT

Computer implemented methods and systems are provided for web log category analysis of website usage. A communication service provider computer system identifies a uniform resource locator (URL) for a resource requested by a mobile device. The communication service provider computer system categorizes the URL. The communication service provider computer system increments a count in a web log category based on categorizing the URL and customer data associated with the mobile device. The communication service provider computer system analyzes a usage of a plurality of websites associated with the web log category based on the count in the web log category.

18 Claims, 6 Drawing Sheets

202 — company.ext/business
204 — company.ext /careers
206 — weather.news.ext
208 — transcoder.weather.ext

Fig. 2

| Index Number | Index Description | Identified Devices |
|---|---|---|
| 0 | 0-50% | |
| 1 | 51-100% | |
| 2 | 101-200% | |
| 3 | 201%+ | |

Fig. 3

|  | weather.ext | weather.news.ext |
|---|---|---|
| Total visits | | |
| Maximum visits | | |
| Maximum visits timeframe | | |
| Unique visitors | | |
| Page views | | |
| Total bytes transferred | | |
| Percent failures | | |
| Income 0-50% | | |
| Income 50-100% | | |
| Income 100-200% | | |
| Income 200%+ | | |
| Male | | |
| Female | | |
| Unknown gender | | |
| Married | | |
| Single | | |
| Divorced/widowed | | |
| Manager | | |
| Professional | | |
| Technician | | |
| Sales | | |
| Administrative | | |
| Craft | | |
| Laborer | | |
| Service | | |
| Frequency 0-50% | | |
| Frequency 50-100% | | |
| Frequency 100-200% | | |
| Frequency 200%+ | | |
| Good credit score | | |
| Bad credit score | | |
| Alabama | | |
| Alaska | | |
| Arizona | | |
| Arkansas | | |
| California | | |

Fig. 4

AUDIENCE MEASUREMENT OF WIRELESS WEB SUBSCRIBERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from providers, such as website servers. Content providers can enable advertisers to supplement the requested content with advertisements. In general, advertisers pay higher prices for advertisements that reach specific intended audiences because targeted advertisements may increase the chances of favorable responses to the advertisement.

For example, an advertisement provider designs a luxury automobile advertisement for mobile device users. Mobile device users who have high incomes are more likely to have sufficient disposable income to respond favorably to the advertisement. However, the advertiser provider may not want to pay to provide this advertisement to numerous content providers whose websites are visited by mobile device users with medium or low incomes, because these mobile device users are not as likely to have sufficient disposable income to respond favorably to the advertisement. Therefore, advertisers would want to provide such advertisements to selected content providers.

SUMMARY

The present disclosure provides computer implemented methods and systems for web log category analysis of website usage. In some embodiments, a communication service provider computer system identifies a uniform resource locator (URL) for a resource requested by a mobile device. The communication service provider computer system categorizes the URL. The communication service provider computer system increments a count in a web log category based on categorizing the URL and customer data associated with the mobile device. The communication service provider computer system analyzes a usage of a plurality of websites associated with the web log category based on the count in the web log category.

In some system embodiments, the system includes a database and a communication service provider computer system. The communication service provider computer system identifies a URL for a resource requested by an identified device and categorizes the URL. The communication service provider computer system also increments a count in the database for a web log category based on the categorized URL and customer data associated with the mobile device. Additionally, the communication service provider computer system analyzes a usage of a plurality of websites associated with the web log category based on the count in the web log category.

In some other embodiments, a communication service provider computer system identifies a uniform resource locator (URL) for a resource requested by a mobile device. The communication service provider computer system categorizes the URL. The communication service provider computer system determines a frequency index for a web log category associated with the mobile device based on categorizing the URL. The communication service provider computer system increments a count in a web log category based on categorizing the URL and customer data associated with the mobile device, wherein the customer data associated with the mobile device includes the frequency index. The communication service provider computer system analyzes a usage of a plurality of websites associated with the web log category based on the count in the web log category.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 lists several example uniform resource locators.

FIG. 3 illustrates a web log category count distribution in a database according to some embodiments of the present disclosure.

FIG. 4 illustrates a web log category history associated with identified devices according to some embodiments of the present disclosure.

DETAILED DESCRIPTION

Figure 1:
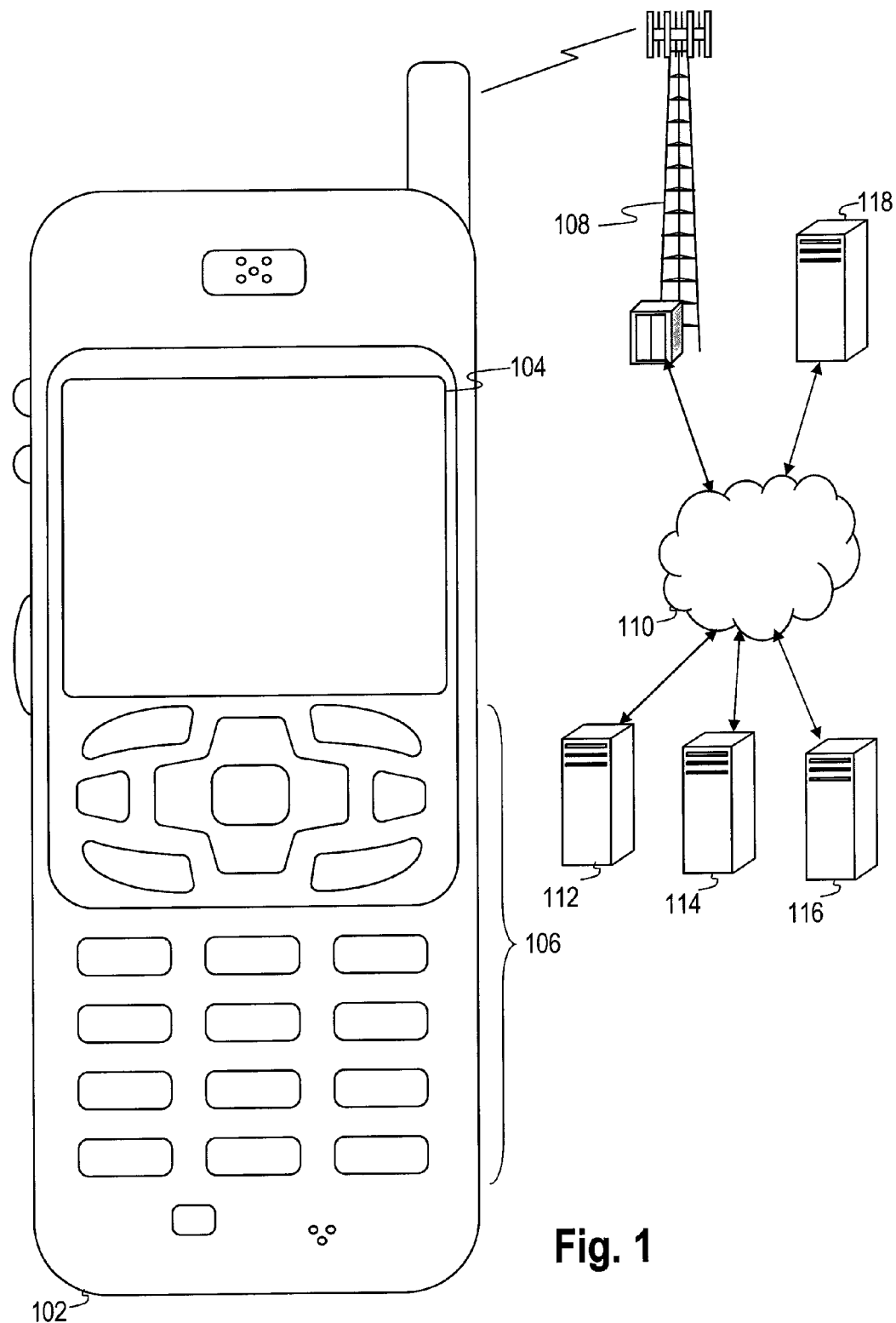
FIG. 1 is an illustration of a wireless communications system for web log category analysis of website usage according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A device user may use a browser to request a resource, such as a web page, from a website server. The web page may appear to be a monolithic logical unit when viewed by the device user, but many web pages may include some hypertext markup language (HTML) text, multiple images, and applets that provide streaming audio or video, many of which may be accessed as a separate resource. When a browser uses a URL to request a web page from a website server, the requested web page may include many different resources which also may be requested via their own uniform resource locators (URLs). When a website server responds to the browser that requested the web page by providing resources such as HTML text, images, and the like, the website server may maintain a web log of the received request. The web log may provide information about a web page, such as how device users visit the web page, what the visitors see, and what products the visitors purchase. Each visitor may be identified either by the internet protocol (IP) address/domain name of the device that requested the resource, or by a cookie, which is a unique string that identifies each visitor. The web log may list visitors by number of visits, new versus returning visitors, authenticated or unauthenticated visitors, and most frequent visitor. The behavior of a particular visitor may be identified from different statistics, such as the most frequent paths taken, the most frequent web pages accessed, the most frequent entry/exit web pages from the website, how many times the visitor returns at a later time, and how much time a visitor is spending on the website.

However, a website server may not have any information about a new visitor to a website regarding previous websites visited, previous resources requested, or previous online purchases. Furthermore, the website server may not have any information about a returning visitor to the website server's web pages beyond information compiled during the returning visitor's previous visits to the website server's web pages. Therefore, a website server that supplements a web page with many types of advertisements from various advertisers typically has little information about which advertisements would best match the website's visitor based on the visitors' previous websites visited, previous resources requested, or previous online purchases.

Although a communication service provider may monitor communications between a customer device and websites to determine optimized advertisement targeting, many resource requests are not helpful in determining the intent for visiting a website, such as the text, multiple images, applets, and other resources that a website server provides in response to a request for a single web page. For example, if a customer device requests a web page from a news organization, a website server may respond with resources consisting of the requested web page and three unsolicited advertisements as supplements to the web page. When the communication service provider server analyzes the resource requests between the customer device and the website server, three of the four resource requests are for unsolicited advertisements, which are not indicative of the device usage or purchasing tendencies of the device user. Furthermore, many mobile devices use browsers to access web pages indirectly, as the mobile device's small display screen may require the web page request to be initially routed to a transcoder. Transcoders may convert web pages designed for full-sized display screens to be displayed on the mobile device's small display screen. Analyzing a web page request from a mobile device may result in identifying the transcoder, not the requested web page, as the requested resource. Additionally, many URLs are lengthy character strings that are difficult to analyze to determine the intended resource requested by the mobile device.

The present disclosure provides computer implemented methods and systems for web log category analysis of website usage. It may happen that some URLs that are accessed from the mobile device are of negligible interest and may be ignored or filtered, thereby saving processing load and/or improving the accuracy of URL hit counts. A communication service provider server identifies URLs for resource requests, but does not determine categories for advertisers' URLs or the URLs with specific extensions. The communication service provider server may also be referred to as a communication service provider computer system and may comprise multiple computers or servers. The communication service provider server may be a server operated by a communication service provider and may be positioned within a network wherein the communication service provider server, or the aggregation of communication service provider servers across the communication service provider network, is able to monitor a large segment of telecommunications traffic. The communication service provider server determines categories of interest for the rest of the URLs, and logs how often resources are requested based on each category of interest. The communication service provider server may compile the usage of each requesting device based on this logged data. Alternatively, the communication service provider server may determine categories of interest for URLs and provide this information to an audience measurement system and/or an audience measurement company, and the audience measurement system may log how often resources are requested based on each category of interest and compile the usage of each requesting device based on this logged data.

Some domain names within the URLs may be associated with multiple categories of interest to advertisers, while other domain names within URLs may be associated with only a single category of interest. Therefore, the communication service provider server may analyze each URL to determine if the URL includes a domain name that matches any of a list of domain names that are associated with multiple categories. For the URLs that include domain names that are associated with multiple categories, the communication service provider server categorizes the URL based on the URL itself, which may include a keyword or a sub-domain that is associated with a specific category. For the URLs that do not include domain names that are associated with multiple categories, the communication service provider server categorizes the URL based on the domain name included in the URL, where the domain name may be associated with a single category. After determining a category for the stored URL, the communication service provider server, or the audience measurement system, increments a count in web logs based on the category and customer data associated with the identified device used to request the resource.

The customer data may include information that the communication service provider has about the customer, but which the website server does not have. For example, the communication service provider may have access to a customer's income level, gender, marital status, geographic location when the customer requested a website, and occupation from the customer's application for communication service.

Instead of only providing information about visits to a particular website, such web logs may provide information about visits to categories of websites and information about the visitors to each website. The communication service provider server or the audience measurement system may analyze the usage of multiple websites based on the web log categories and the customer data. Advertisers may use analysis of the usage to target websites with advertisements that match the interests of the websites' visitors, such as the advertisements that are supplements to requested web pages. For example, a luxury automobile advertiser may be interested in providing an advertisement to one of many websites that offers weather forecasts. Although a first weather-oriented website may have more visitors than a second weather-oriented website, the communication service provider server may count more visits to the second-weather-oriented website by customers with high income levels. The communication service provider server or the audience measurement system may also count each website visit based on a frequency of visits to a website category. For example, the communication service provider server determines that most of the visits to the first weather-oriented website are made by a small number of customers who frequently visit only the first weather-oriented website, while most of the visits to the second weather-oriented website are made by a large number of customers who infrequently visit weather-oriented websites in general. Advertisers may use such information to determine whether to provide advertisements to a website that has a small number of loyal and frequent visitors who rarely visit similar websites or to a website that has a large number of infrequent visitors who visit many similar websites.

The communication service provider server may provide a subscribing audience measurement system with the information about visits to categories of websites and information about the visitors to each website. Typically, audience measurement systems estimate audience information based on projecting audience information from small sample sizes, such as a quarter of one percent of a market, onto a larger audience, such as the entire market. However, the communication service provider server may compile information about visits to categories of websites and information about the visitors to each website for all of the customers of the communication service provider, where all of the customers total more than a quarter of the market. Therefore, the communication service provider server may compile information for more than one hundred times the number of customers that are measured by the audience measurement system. The larger scale for the information may eliminate concerns over whether small samples of the market are actually randomly sampled and may provide direct information about a substantial portion of the market, where advertisers are interested in this substantial portion of the market.

FIG. 1 shows a wireless communications system including a mobile device 102. FIG. 1 depicts the mobile device 102, which is operable for implementing aspects of the present disclosure, but the present disclosure should not be limited to these implementations. Though illustrated as a mobile phone, the mobile device 102 may take various forms including a personal computer, a mobile telecommunication device, a mobile handset, a personal digital assistant (PDA), a mobile computer, a handheld gaming device, a wireless mobile device, a pager, a portable computer, a tablet computer, a laptop computer, a digital camera, a digital music player, and a digital calculator. Many suitable devices combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 104 and a touch-sensitive surface or keys 106 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer device 102.

The mobile device 102 may execute a web browser application which enables the display 104 to show a web page. The web page may be obtained via wireless communications with a base transceiver station 108, a wireless network access node, a peer device 102 or any other wireless communication network or system. The base transceiver station 108 (or wireless network access node) is coupled to a wired network 110, such as the Internet. Via the wireless link and the wired network 110, the mobile device 102 has access to information on various servers, such as a communication service provider server 112, which may also be referred to as the communication service provider computer system 112. The communication service provider server 112 may provide content that may be shown on the display 104. The communication service provider server 112 may also provide access to a first content provider server 114 and a second content provider server 116. Alternately, the mobile device 102 may access the base transceiver station 108 through a peer device 102 acting as an intermediary, in a relay type or hop type of connection. In an embodiment, an audience measurement system 118 may be in communication with the communication service provider server 112.

FIG. 2 shows a table of example uniform resource locators (URLs). The URLs 202-208 illustrate various types of resource requests that may be analyzed by the communication service provider server 112 to determine the intent of a web page visitor. For example, company.ext/business 202 and company.ext/careers 204 include the domain name company.ext, followed by different character strings. When the communication service provider server 112 begins parsing a URL from left to right, the communication service provider server 112 first encounters company.ext, which is the domain name for the web page where each of the URLS 202 and 204 may be selected. The intent of a visitor to the company.ext web page may depend on which of the URLs 202 and 204 that the visitor selects, and this intent may be inferred based on the communication service provider server 112 parsing the rest of the URL from left to right to encounter the character strings that follow company.ext/in the selected URL. If the visitor to the company.ext web page selects company.ext/business 202, the visitor may have the intent to order company service for the visitor's employer. If the visitor to the company.ext web page selects company.ext/careers 204, the visitor may have the intent to investigate the possibility of working for the company.

The weather.news.ext URL 206 may be for a weather web page offered by a news organization that publishes many different types of news stories. The URLs for each of the different news stories may begin with "news," followed by different character strings that designate the different news stories. Instead of differentiating between different types of news stories, an advertiser may want to identify a visitor to the news.ext web page as a visitor with an interest in news, regardless of what types of news stories are subsequently requested. However, an advertiser that is interested in advertising at a weather-oriented website, such as transcoder.weather.ext 208, may want to identify visits to the news.ext website that request a resource from the weather.news.ext website.

FIG. 3 illustrates a web log category count distribution 300 in a database 302 according to some embodiments of the present disclosure. The distribution 300 may be used to categorize the tendencies of a visitor to various types or categories of web pages. The communication service provider server 112 may maintain the distribution 300 in the database 302 for each category of web pages visited. The usage of each customer device served by a communication service provider may be analyzed based on the number of logged visits by the customer device to a specific category of web page compared to the average number of visits by other customer devices to the specific category of web page.

For example, if a communication service provider logs 10 visits by a customer device to music-oriented web pages in one day, and the average number of daily customer visits by other customer devices to music-oriented web pages is 8, then the customer device visited music-oriented web pages at a rate 125% (100%×10/8) compared to the average for other customer devices. The distribution 300 in the database 302 includes columns for index number 304, index description 306, and identified devices 308. For the example of the music-oriented web page visitor, 125% corresponds to the range 101-200% in the index description 306 column in row 310. Because the row 310 also includes the value 2 in the index number 304 column, the value 2 may be logged in an individual log for the visitor as the index number 304 that describes the visitor's tendencies to visit music-oriented web pages.

The IP address or some other unique identifier for the visitor may be entered in the identified devices 308 column. For example, music advertisers may use the identified devices 308 column in targeting web page visitors who have high tendencies to visit music-oriented web pages. A music advertiser may send a music download advertisement only to identified devices corresponding to row 310 or higher, which are for customer devices that visit music-oriented web pages at a rate more than the average number of visits by other customer devices to music-oriented web pages.

FIG. 4 shows a block diagram of a web log category history 400 associated with multiple websites according to some embodiments of the present disclosure. The history 400 may be used to log how often customer devices, such as the mobile device 102, visit a particular type of web page over time. The communication service provider server 112 may maintain the history 400 for each category of web page visited by the mobile device 102. Although the history includes columns for two weather-oriented websites, weather.ext 402 and weather.news.ext 404, the history 400 may include columns for any number of websites for any category of website. The history 400 also includes rows associated with visits 406, transfer data 408, customer income levels 410, customer gender 412, customer marital status 414, customer occupation 416, customer frequency of visiting the website category 418, customer credit rating 420, and customer location 422. The history 400 may also include rows for other demographics, subscriptions, purchases, content downloaded, and other customer data. Each of the rows 406-422 includes counts that correspond to each of the website columns 402 and 404. The history 400 may list the number of visits for each day during the last week, the number of visits during the last week, the number of visits during the last month, and/or the number of visits during the last year. The communication service provider may use the history 400 to detect trends in website usage. Advertisers may want to specifically target types of device users who are visiting a specific web page frequently because such visitors may be inclined to respond positively to specific advertisements or are known to purchase from a specific web page.

The visits rows 406 indicate how often devices visit a website overall, such as a total number of visits in a week, a maximum number of visits and a corresponding timeframe, such as the most visits for any day of the week and an identification of Friday as the day the corresponding website received the most visits. The visits rows 406 also indicate the number of unique visitors, in comparison to returning visitors, and the number of pages viewed by the visitors. The transfer data rows 408 indicate how many total bytes of information were transferred to the visitors and how often a transfer failed. The customer income levels rows 410 indicate a distribution of visitors based on customer income levels, such as the number of visitors whose income ranges from 50% of the national income average to 100% of the national income average. The customer gender rows 412 indicate a distribution of visitors based on the gender of the visitors, when known. The customer marital status rows 414 indicate a distribution of visitors based on the marital status of the visitors, when known. The customer occupation rows 416 indicate a distribution of visitors based on the occupations of the visitors, such as professional, technician, or sales. The customer frequency of visiting the website category rows 418 indicate a distribution of visitors based on how frequently the visitors visit the category of website associated with the history 400, such as how many of visitors that visited weather.ext visit weather-oriented websites at a frequency that is from 51% of the average frequency rate for visitors to weather-oriented websites to 100% of the average frequency rate for visitors to weather-oriented websites. The customer credit rating rows 420 indicate a distribution of visitors based on whether the visitors have a good credit score or a bad credit score, wherein the division between good credit scores and bad credit scores are pre-defined. The customer location rows 422 indicate a distribution of visitors based on the geographic location of the visitor when the visitor visited the website. Although the history 400 depicts locations based on the first five states of the United States in an alphabetical list, all states may be listed or other geographic locations may be listed, such as a city or a location within a city.

Figure 5:
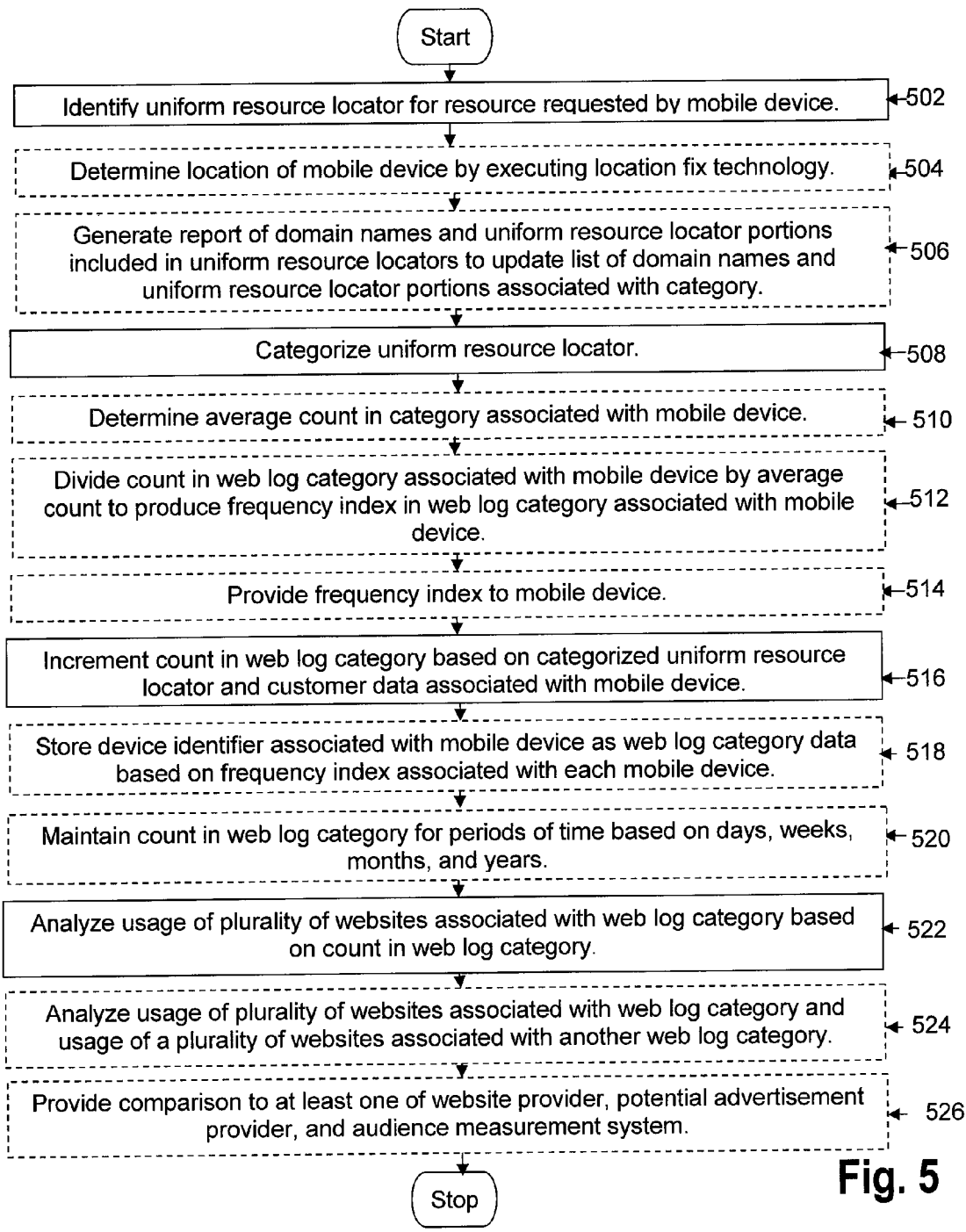
FIG. 5 is a flowchart of a method for web log category analysis of website usage according to some embodiments of the present disclosure.

FIG. 5 is a flowchart illustrating a method for web log category analysis of website usage according to some embodiments of the present disclosure. Executing the method enables the communication service provider server 112 to determine the categories of resources requested by a device, record the requests and customer data associated with the requesting device in web logs, and assist targeting advertising by analyzing the usage of websites based on the web logs.

In box 502, a URL is identified for a resource requested by an identified device. For example, the communication service provider server 112 identifies the weather.news.ext URL 206 for a web page requested by the mobile device 102. Although the news.ext web page may also include the weather.news.ext URL 206, the communication service provider server 112 analyzes each URL individually. In some embodiments, the communication service provider server 112 provides the identified URL to the audience measurement system 118 based on a subscription of the audience measurement system 118, or a subscription of an audience measurement company that operates the audience measurement system 118, to a service plan for web category analysis and/or web category data.

In box 504, a location of the mobile device is optionally determined. For example, the mobile device 102 determines a location of the mobile device 102 by executing a location fix technology associated with a cell tower 108, a cell sector centroid, an advanced forward link trilateration, a global positioning system, or a hybrid location fix technology. The location of the mobile device 102 may be used for the customer location rows 422, instead of a customer's location based on an application for communication service. Advertisers may be interested in analyzing usage of websites based on the dynamic location of the mobile device 102. In some scenarios, the location of interest may be the location from which the mobile device 102 requests the website rather than the home mailing address of a subscriber to the mobile communications service associated with the mobile device 102. In some embodiments, the communication service provider server 112 provides the determined location of the mobile device 102 to the audience measurement system 118 based on the subscription to the service plan for web category analysis and/or data.

In box 506, a report of domain names and URL portions included in URLs is optionally generated to update a list of domain names and URL portions associated with the category. If any of the identified domain names or and URL portions are missing from the list of domain names and URL portions, the missing domain names and URL portions are added to the list. Additionally, the report of domain names and URL portions enables the list of domain names and URL portions that are associated with multiple categories to be updated. For example, if a website for a domain name previously associated with a single category diversifies, such that visits to the website may indicate different categories of interest, the domain name may be added to the list of domain names and URL portions that are associated with multiple categories. Furthermore, the report of domain names and URL portions enables the list of domain names and URL portions that are associated with a single category to be updated. For example, if a new website for a new domain name is identified in the report, the domain name may be added to the list of domain names and URL portions that are associated with a single category. The communication service provider server 112 generates the domain name and URL portions report occasionally, as these domain names and URL portions change over time. Alternatively, the audience measurement system 118 generates the report of domain names and URL portions included in URLs. When provided with the identified URL, the audience measurement system 118 may execute boxes 506-524.

In box 508, the URL is categorized. For example, the communication service provider server 112 parses the weather.news.ext URL 206 from left to right and matches the weather portion of the weather.news.ext URL 206 to one of the list of domain names and URL portions associated with the weather web log category. Because the "news" URL portion is associated with multiple categories, any URL containing the "news" URL portion is further parsed to determine whether another portion of the URL matches a list of URL portions, such as "weather" associated with the weather category. The portion of a weather.news.ext URL 206 may be a sub-domain, such as "weather," that is associated with the weather web lob category. In another example, the communication service provider server 112 categorizes the transcoder.weather.ext URL 208 by parsing the transcoder.weather.ext URL 208 to match the domain name to one of the list of domain names associated with only one category. In contrast to domain names associated with multiple categories, only advertisers interested in the weather web log category may be interested in visitors that select the transcoder.weather.ext URL 208, regardless of which characters follow "weather.ext" in the URL. Therefore, a domain name within a URL, such as weather.ext, is first compared to a list of domain names that are associated with multiple categories. Only domain names that do not match a list of domain names that are associated with multiple categories are categorized based on the domain name alone. For example, because company.ext is associated with both the business category and the career category, categorizing company.ext requires the matching of portions of the entire URL, such as a sub-domain. In contrast, because the transcoder.weather.ext URL 208 is associated with only the weather category, the transcoder.weather.ext URL 208 is categorized as weather based on the domain name alone.

Because some URLs include a lengthy string of characters, the communication service provider server 112 may parse the URL until the communication service provider server 112 recognizes a domain name or until the communication service provider server 112 determines that the URL does not include a recognized domain name. In this example, the domain name weather.ext is associated only with the weather web log category. The lists of domain names associated with a single category and multiple categories do not include a domain name associated with a transcoder. Therefore, any parsing that produces the domain name for a transcoder will not result in a category match, but will result in continued parsing until the domain name for the resource that the device user actually requested has been parsed and identified. The communication service provider server 112 may begin parsing the URL at a portion of the URL before a slash ("/") and proceed from right to left. If beginning parsing before a slash and parsing right to left does not produce a domain name, the communication service provider server 112 may parse the URL after the slash from left to right. Alternatively, the audience measurement system 118 categorizes the identified URL.

In box 510, an average count is optionally determined in the web count category associated with the mobile device. For example, the communication service provider server 112 determines an average count in the weather web count category associated with the mobile device 102. The communication service provider server 112 counts the number of requests for resources made to weather-oriented websites by mobile devices 102, and divides this number by the number of mobile devices 102 that requested resources from weather-oriented websites to produce the average count. In another example, the communication service provider server 112 determines an average purchase amount in the music category associated with the mobile device 102. Alternatively, the audience measurement system 118 determines an average count in the weather web count category associated with the mobile device 102.

In box 512, the count in the web log category associated with the mobile device is optionally divided by the average count to produce a frequency index in the web log category associated with the mobile device. For example, the communication service provider server 112 divides the count in the weather web log category associated with the mobile device 102 by the average count in the weather web count category to produce a frequency index in the weather web log category associated with the mobile device 102. The distribution 300 depicts how the frequency indexes may be determined, such as the index number 304 column that corresponds to the various ranges of comparative percentages listed in the index description column 306. The communication service provider server 112 may also compare the total purchase amounts for each device while visiting music-oriented web pages to the average purchase amounts for other mobile devices 102 while visiting music-oriented web pages. By comparing purchases, the communication service provider server 112 may produce a purchase index that is similar to the count index depicted in FIG. 3. Alternatively, the audience measurement system 118 divides the count in the weather web log category associated with the mobile device 102 by the average count in the weather web count category to produce a frequency index in the weather web log category associated with the mobile device 102.

In box 514, the frequency index is optionally provided to the mobile device. For example, the communication service provider server 112 provides the frequency index of "2" in the weather web log category to the mobile device 102, similar to the distribution 300. In another example, the communication service provider server 112 provides the frequency index of "3" for purchases in the music web log category to the mobile device 102, similar to the distribution 300. Alternatively, the audience measurement system 118 provides the frequency index of "2" in the weather web log category to the mobile device 102.

In box 516, a count is incremented in a web log category based on the categorized URL and customer data associated with the mobile device. For example, the communication service provider server 112 increments a count in the history 400 for the weather web log category based on the categorized transcoder.weather.ext URL 208 and the occupation of professional that is associated with the mobile device 102. The count may be a purchase amount. For example, instead of counting the comparative frequency of how often the mobile device 102 visited music-oriented web pages, in some embodiments where the information is available, the web log may count the purchase amounts made by the mobile device 102 while visiting music-oriented web pages. Alternatively, the audience measurement system 118 increments a count in the history 400 for the weather web log category based on the categorized transcoder.weather.ext URL 208 and the occupation of professional that is associated with the mobile device 102.

In box 518, a device identifier associated with the mobile device is optionally stored as web log category data based on the count index associated with the mobile device. For example, the communication service provider server 112 stores a unique device identifier associated with the mobile device 102 as customer data in a web log based on the frequency index, such as the index number 304, associated with the mobile device 102. Advertisers interested in the most frequent visitors to a particular category may use the unique device identifier in an unsolicited advertising campaign. Alternatively, the audience measurement system 118 stores a unique device identifier associated with the mobile device 102 as customer data in a web log based on the frequency index.

In box 520, the count in the web log category associated with the identified device is optionally maintained for periods of time based on days, weeks, months, and years. For example, the communication service provider server 112 maintains the count in the weather web log category for periods of time based on days, weeks, months, and years. In another example, the communication service provider server 112 maintains the purchase amount in the music web log category for periods of time based on days, weeks, months, and years. Alternatively, the audience measurement system 118 maintains the count in the weather web log category for periods of time based on days, weeks, months, and years.

In box 522, a usage of a plurality of websites associated with the web log category is analyzed based on a count in the web log category. For example, the communication service provider server 112 analyzes a usage of the websites 402 and 404 based on the weather web log category, wherein an action is taken based on analyzing the usage. The communication service provider server 112 may provide an analysis of the usage to a website server when the mobile device 102 accesses a web page serviced by the website server. The website server may take an action based on the analysis from the communication service provider server 112 by selecting the supplemental advertisement that the website server provides with the web page to the mobile device 102. Additionally, the communication service provider server 112 may also enable an advertiser to take an action by targeting the mobile device 102 with an unsolicited advertisement based on the analysis of the usage. For example, the communication service provider server 112 may provide an analysis of the history 400 to a music advertiser because trends indicate the mobile device 102 is progressively visiting more music-oriented web pages, a favorable tendency identified by the music advertiser. Alternatively, the audience measurement system 118 analyzes a usage of the websites 402 and 404 based on the weather web log category.

In another example, the analysis may indicate how many of the devices 102 accessed each music-oriented web page for the first time, how many of the devices 102 accessed each web page on a daily basis, and how many of the devices 102 visit music-oriented web pages at a rate that is at least 200% compared to the average number of visits by other devices 102 to music-oriented web pages. Furthermore, the communication service provider server 112 may also provide to the website server the same analysis of other music-oriented web pages associated with other websites. Comparing the analysis of the website to the analysis of similar websites may assist both the website provider and potential advertisers to take action by evaluating the effectiveness of the website in attracting access by types of mobile device users. For example, an advertiser that plans on targeting mobile devices 102 that visit music-oriented web pages at a rate that is at least 200% compared to the average number of visits by other mobile devices 102 to music-oriented web pages may use this comparison to take action by determining which websites to use for advertising purposes. In another example, the website provider may use this comparison to take action by evaluating a marketing campaign designed to attract device users who infrequently access music-oriented web pages to a new music-oriented web page.

In box 524, the usage of the plurality of websites associated with the web log category and a usage of a plurality of websites associated with another web log category is optionally analyzed. For example, the communication service provider server 112 analyzes the usage of the weather-oriented websites and the usage of websites associated with the automobile web log category to take action by identifying mobile device 102 users most likely to respond to an advertiser's specific advertisement. Analyzing the usage of various websites may produce a comparison of the count in the web log category, a count of unique user visits, and the customer data associated with the mobile devices for each of the websites, such that an advertiser may take action by identifying which weather-oriented website attracts the most unique user visits from mobile device 102 users whose income is in a specified range, such as more than twice the national average, and who also frequently visit specified websites, such as luxury automobile-oriented websites. A unique user visit is a count of how many visits a website received from different mobile device 102 users. For example, when a first mobile device 102 user visits the company.ext website ten times and a second mobile device 102 user visits the company.ext website one time, the company.ext website receives eleven visits from two unique visitors, hence the unique user visit count in this case would be 2. Alternatively, the audience measurement system 118 analyzes the usage of the weather-oriented websites and the usage of websites associated with the automobile web log category to identify mobile device 102 users most likely to respond to an advertiser's specific advertisement.

In box 526, the comparison is provided to at least one of a website provider, a potential advertisement provider, and an audience measurement system. For example, the communication service provider server 112 provides the comparison to the audience measurement system 118, such as an enterprise that measures radio listener-ship and television viewer-ship, that has a subscription for analyzing websites based on web log categories.

If the communication service provider server 112 provides the categorized URL to the audience measurement system 118 while executing box 508, the communication service provider server 112 does provide the comparison to the audience measurement system 118 because the audience measurement system 118 produces the comparison itself. Audience measurement systems estimate audience information. Audience measurement is any method of measuring how many people are in an audience, usually in relation to radio listenership and television viewership, but also website usage. Audience measurement often also includes demographic information to help content providers determine who is listening or viewing, rather than just how many. Measurements may be broken-down by media market, which for the most part corresponds to metropolitan areas, both large and small. The audience measurement system 118 may provide the analysis or the comparisons to clients, which enable the clients to take informed actions. Examples of such actions discussed above include selecting a supplemental advertisement that a website server provides with a web page to a requesting mobile device, targeting a mobile device with an unsolicited advertisement based on the analysis of the usage, evaluating the effectiveness of a website in attracting access by types of mobile device users, determining which websites to use for advertising purposes, evaluating a marketing campaign designed to attract mobile device users, identifying mobile device users most likely to respond to an advertiser's specific advertisement, and identifying which websites attracts the most unique user visits from mobile device users whose income is in a specified range and who also frequently visit specified websites.

Figure 6:
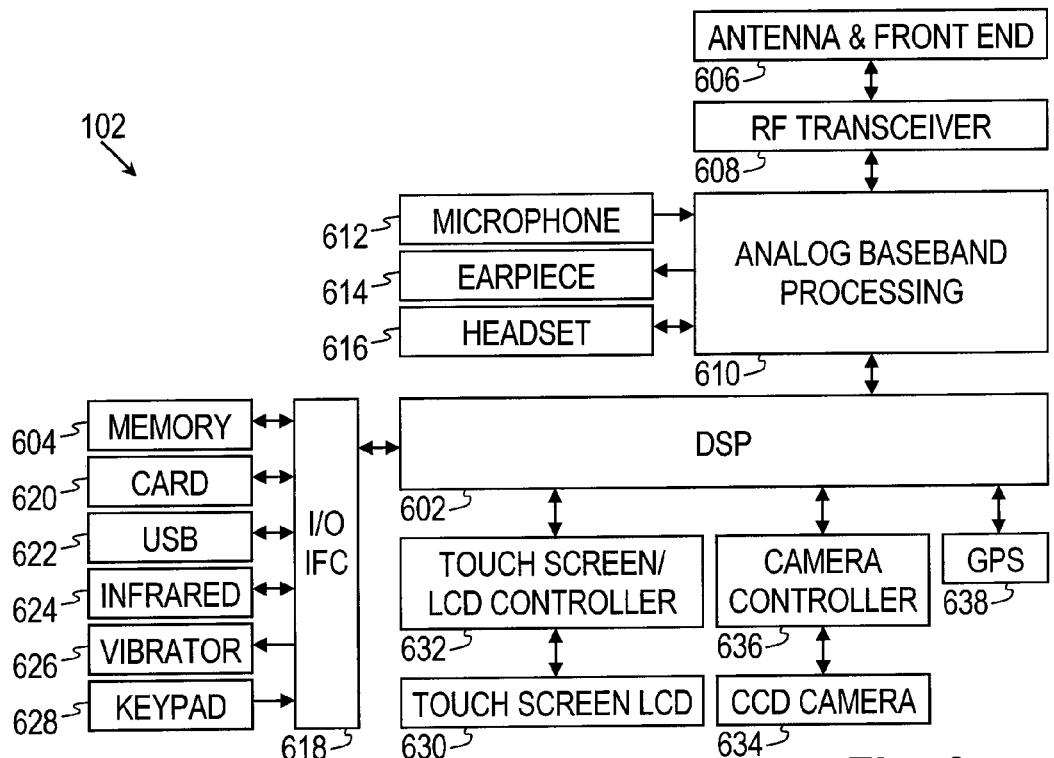
FIG. 6 is a block diagram of an illustrative mobile device according to some embodiments of the present disclosure.

FIG. 6 shows a block diagram of the mobile device 102. While a variety of known components of devices 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 102 to send and receive information from a cellular network or some other available wireless communications network or from a peer device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset 616 and outputs to the earpiece speaker 614 and the headset port 616. To that end, the analog baseband processing unit 610 may have ports for connecting to the built-in microphone 612 and the earpiece speaker 614 that enable the mobile device 102 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast fourier transforming, and cyclic prefix appending, and for a receiver function the DSP 602 may perform cyclic prefix removal, fast fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby devices and/or wireless base stations.

The input/output interface 618 may further connect the DSP 602 to the vibrator 626 that, when triggered, causes the mobile device 102 to vibrate. The vibrator 626 may serve as a mechanism for silently alerting the user to any of various events such as an incoming call, a new text message, and an appointment reminder.

The keypad 628 couples to the DSP 602 via the input/output interface 618 to provide one mechanism for the user to make selections, enter information, and otherwise provide input to the mobile device 102. Another input mechanism may be the touch screen LCD 630, which may also display text and/or graphics to the user. The touch screen LCD controller 632 couples the DSP 602 to the touch screen LCD 630.

The CCD camera 634 enables the mobile device 102 to take digital pictures. The DSP 602 communicates with the CCD camera 634 via the camera controller 636. The GPS sensor 638 is coupled to the DSP 602 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 7:
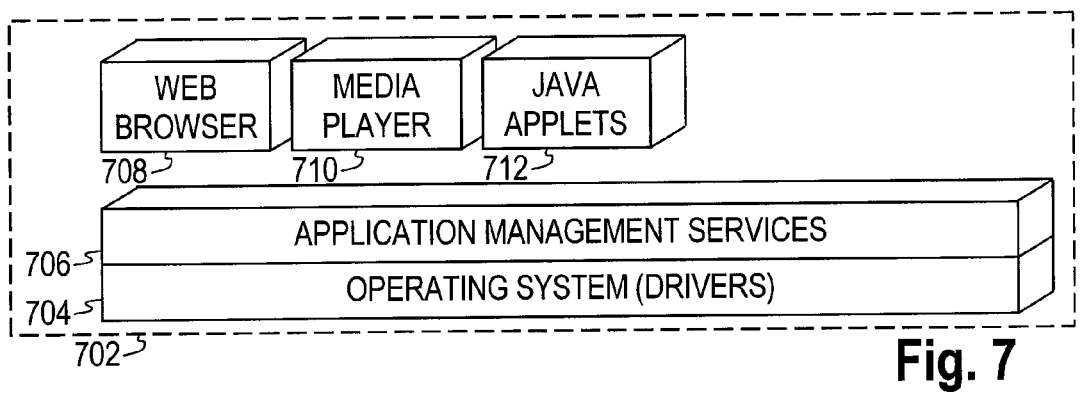
FIG. 7 is a block diagram of an illustrative software configuration for a mobile device according to some embodiments of the present disclosure.

FIG. 7 illustrates a software environment 702 that may be implemented by the DSP 602. The DSP 602 executes operating system drivers 704 that provide a platform from which the rest of the software operates. The operating system drivers 704 provide drivers for the mobile device 102 hardware with standardized interfaces that are accessible to application software. The operating system drivers 704 include application management services ("AMS") 706 that transfer control between applications running on the mobile device 102. Also shown in FIG. 7 are a web browser application 708, a media player application 710, and JAVA applets 712. The web browser application 708 configures the mobile device 102 to operate as a web browser, allowing a user to enter information into forms and select links to retrieve and view web pages. The media player application 710 configures the mobile device 102 to retrieve and play audio or audiovisual media. The JAVA applets 712 configure the mobile device 102 to provide games, utilities, and other functionality.

Figure 8:
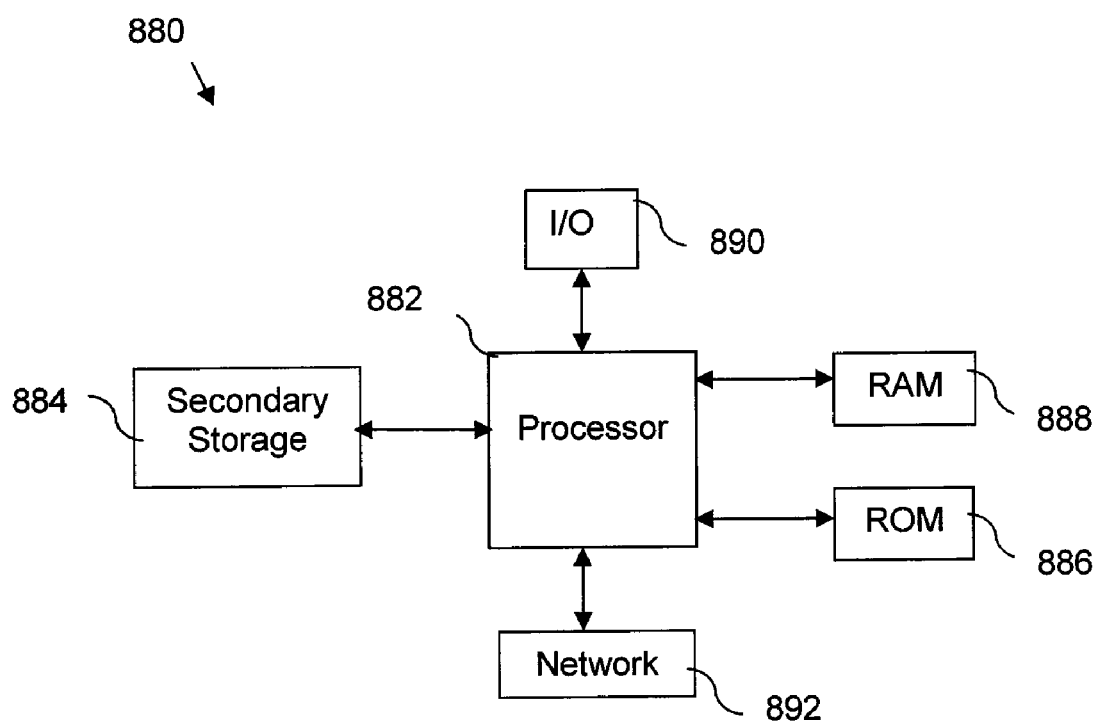
FIG. 8 illustrates an exemplary general purpose computer system suitable for implementing the several embodiments of the disclosure.

Portions of the system described above may be implemented on one or more general-purpose computers with sufficient processing power, memory resources, and network throughput capability to handle the necessary workload placed upon it. For example, the communication service provider server 112 may be implemented as one or more general purpose computers. In some contexts, the communication service provider server 112 may be referred to as the communication service provider computer system 112. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and/or worldwide interoperability for microwave access (WiMAX) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space.

The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for web log category analysis of website usage, comprising:
   a database; and
   a communication service provider computer system including at least one processor operable to:
   identify a uniform resource locator (URL) for a resource requested by a mobile device;
   categorize the URL in a URL category;
   determine a frequency index associated with the mobile device for the URL category;
   increment a count in each of a plurality of customer data distributions for the URL in a web log category history in the database based on categorizing the URL and based on customer data associated with the mobile device, wherein one of the customer data distributions for the URL is a frequency index distribution, and wherein the frequency index distribution is incremented based on the frequency index associated with the mobile device for the URL category; and
   analyze a usage of a plurality of websites associated with the web log category history based on counts in the web log category history;
   wherein determining the frequency index comprises:
   the communication service provider computer system determining an average number of visits to URLs associated with the URL category for a plurality of mobile devices count in the web log category associated with the mobile device;
   the communication service provider computer system dividing a number of visits to URLs associated with the URL category by the mobile device by the average number of visits to produce the frequency index associated with the mobile device; and
   the communication service provider computer system providing the frequency index to the mobile device.

2. The system of claim 1, wherein the communication service provider computer system is further configured to parse the URL to match a portion of the URL to any of a list of portions associated with a category.

3. The system of claim 1, wherein the portion of the URL is a sub-domain that is associated with the category.

4. The system of claim 1, wherein the communication service provider computer system is further configured to parse the URL to match a domain name associated with the URL to any of a list of domain names associated with a category.

5. The system of claim 4, wherein the communication service provider computer system is further configured to generate a report, the report comprising domain names included in URLs and the report further comprising URL portions included in URLs, the communication service provider computer system is configured to generate the report to update a list of domain names and URL portions associated with the category.

6. The system of claim 4, wherein the communication service provider computer system is further configured to increment a count of the count is a purchase index.

7. The system of claim 1 wherein the mobile device is one of a mobile telecommunication device, a mobile handset, a personal digital assistant, a mobile computer, a handheld gaming device, a wireless mobile device, a pager, a portable computer, a tablet computer, a laptop computer, a digital camera, a digital music player, and a digital calculator.

8. A computer implemented method for web log category analysis of website usage, comprising:
   a communication service provider computer system identifying a uniform resource locator (URL) for a resource requested by a mobile device;
   the communication service provider computer system categorizing the URL in a URL category;
   the communication service provider computer system determining a frequency index associated with the mobile device for the URL category;
   the communication service provider computer system incrementing a count in each of a plurality of customer data distributions for the URL in a web log category history based on categorizing the URL and based on customer data associated with the mobile device, wherein one of the customer data distributions is a frequency index distribution, and wherein the frequency index distribution is incremented based on the frequency index associated with the mobile device for the URL category; and
   the communication service provider computer system analyzing a usage of a plurality of websites associated with the web log category history based on counts in the web log category history;
   wherein determining the frequency index comprises:
   the communication service provider computer system determining an average number of visits to URLs associated with the URL category for a plurality of mobile devices;
   the communication service provider computer system dividing a number of visits to URLs associated with the URL category by the mobile device by the average number of visits to produce the frequency index associated with the mobile device; and the communication service provider computer system providing the frequency index to the mobile device.

9. The computer implemented method of claim 8, further comprising the communication service provider computer system storing a device identifier associated with the mobile device as web log category data based on the frequency index associated with the mobile device.

10. The computer implemented method of claim 9, the communication service provider computer system further incrementing a count in the web log category history for at least one of a total count associated with each of the websites, a maximum count associated with each of the websites during a timeframe, and a number of unique visitors to each of the websites, a count of page views associated with each of the websites, a number of bytes transferred associated with each of the websites; and a transfer failure rate associated with each of the websites.

11. The computer implemented method of claim 8, wherein categorizing the URL comprises parsing the URL to determine whether a portion of the URL matches any of a list of domain names associated with a web log category of the web log category history.

12. The computer implemented method of claim 8, wherein a web log category of the web log category history comprises a content type.

13. The computer implemented method of claim 8, further comprising the communication service provider computer system further incrementing a count in the web log category history for a number of visits to the URL over one or more periods of time based on days, weeks, months, and years.

14. The computer implemented method of claim 8, wherein the customer data comprises data associated with at least one of demographics, a credit report, an income level, an occupation, a subscription, a purchase, content downloaded, a location associated with a request for the resource, and a time associated with a request for the resource.

15. The computer implemented method of claim 14, further comprising the communication service provider computer system determining a location of the mobile device by executing a location fix technology associated with one of a cell tower, a cell sector centroid, an advanced forward link trilateration, a global positioning system, and a hybrid location fix technology, wherein the customer data comprises the location.

16. The computer implemented method of claim 8, further comprising the communication service provider computer system analyzing the usage of the plurality of websites associated with the web log category history.

17. The computer implemented method of claim 16, wherein analyzing the usage of the plurality of websites produces a comparison of a count of a total number of visits, a count of a number of unique user visits, and a count of the plurality of customer data distributions associated with a plurality of mobile devices for each of the plurality of websites.

18. The computer implemented method of claim 17, further comprising the communication service provider computer system providing the comparison to at least one of a website provider, an enterprise, a potential advertisement provider, and an audience measurement system.

* * * * *